April 4, 1950     H. M. KLEE     2,502,963
COMBINATION AUTOMOBILE AND HOME WARDROBE
Filed April 24, 1947     2 Sheets-Sheet 1
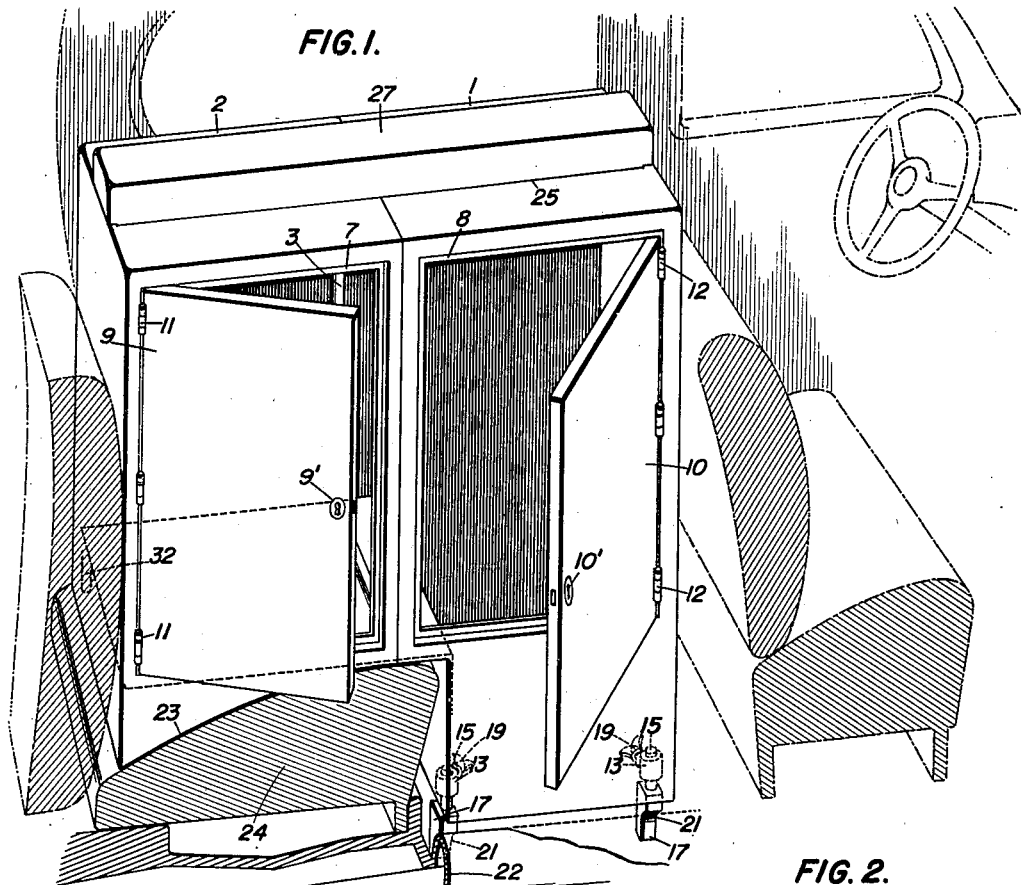
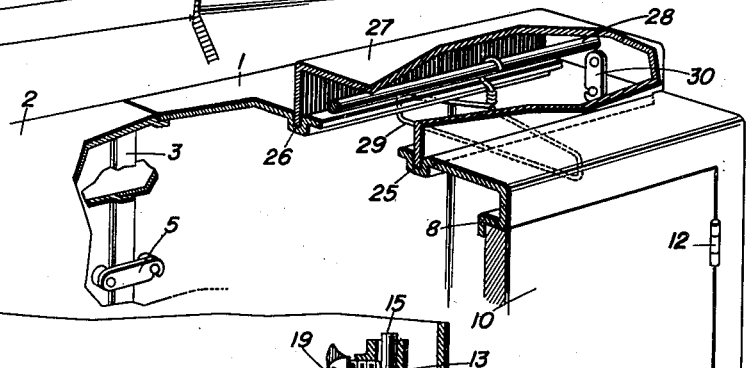
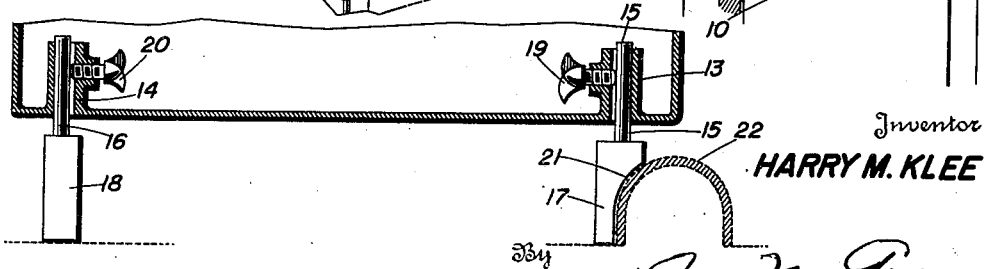
Inventor
HARRY M. KLEE April 4, 1950 H. M. KLEE 2,502,963
COMBINATION AUTOMOBILE AND HOME WARDROBE
Filed April 24, 1947 2 Sheets-Sheet 2
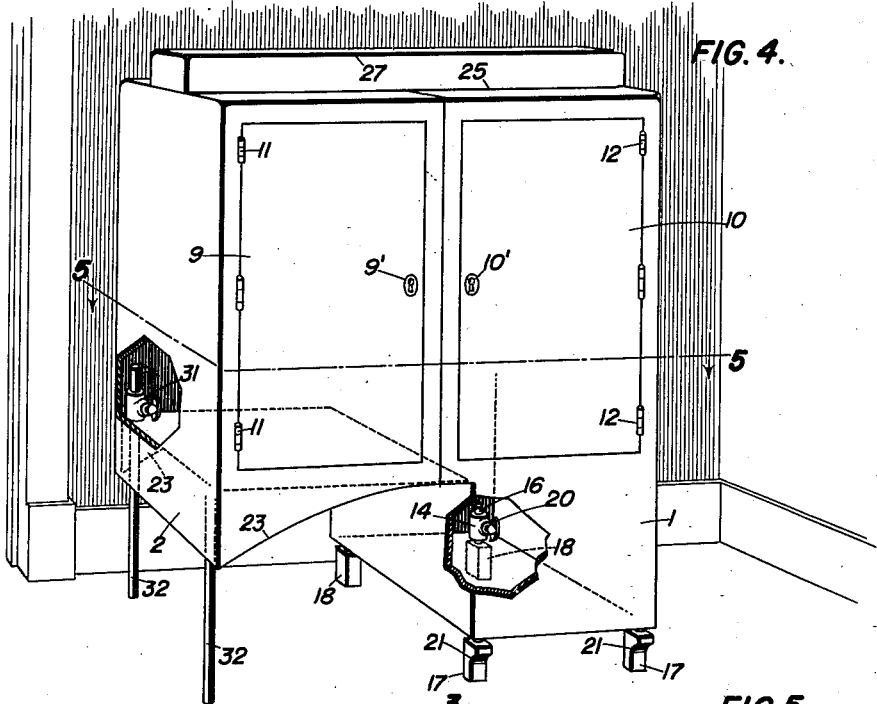
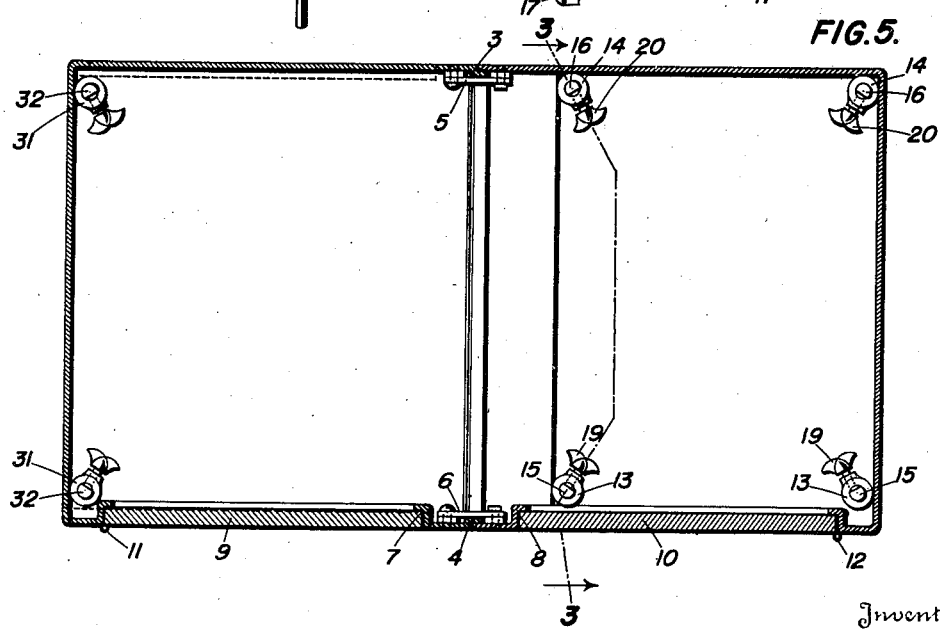
Inventor
HARRY M. KLEE Patented Apr. 4, 1950

2,502,963

UNITED STATES PATENT OFFICE 2,502,963

COMBINATION AUTOMOBILE AND HOME WARDROBE

Harry M. Klee, Washington, D. C.

Application April 24, 1947, Serial No. 743,647

6 Claims. (Cl. 312—107)

This invention relates to a new and improved wardrobe construction, and more particularly to a novel, dual-purpose wardrobe for use in automobile as well as in the home.

Tourists, particularly those who take long, cross-country trips, are cognizant of the trying problem of keeping clothing and the like in good condition during the trip. Packing of the clothing in suitcases, traveling bags and the like naturally causes wrinkles, and attempts to hang the clothing in the rear of the car frequently result in the clothing falling from its support or becoming covered with road dust, or both. Furthermore, when the tourist stops overnight, particularly when a large amount of clothing is stored in bags, it is necessary to remove the bags from the trunk of the automobile for the evening and to place them in the trunk the following morning. Carrying the bags in any other part of the automobile does not solve the problems. The clothes still gather wrinkles in the bags.

It is the prime object of this invention to provide an automobile wardrobe which is so designed and constructed as to insure the transportation of clothing and the like free from wrinkles during long, protracted trips.

It is likewise an object of the invention to provide an automobile wardrobe which insures dustproof storage of clothing while traveling and which will accommodate garments of various lengths.

It is a further object to provide a wardrobe of this type which may be very rapidly assembled in the rear of an automobile and removed therefrom, and which provides convenient access to the contents.

A further object is to provide safe overnight storage of clothing and the like in automobiles, thus obviating the necessity of transporting suitcases and traveling bags to and from hotels.

A still further object is to provide a structure of this character which, when removed from the automobile, may be conveniently set up in the home to provide an indoor wardrobe.

Referring now to the accompanying drawings, in which like reference characters refer to like parts:

Fig. 1 is a perspective view of the wardrobe as shown assembled in an automobile;

Fig. 2 is a perspective view of the upper portion the wardrobe, partially cut away to show structural details;

Fig. 3 is a detailed cross-section of the wardrobe taken substantially on line 3—3 of Fig. 5;

Fig. 4 is a further perspective view of the wardrobe showing it in place in a room as an item of furniture; and Fig. 5 is a horizontal section of the wardrobe taken substantially on line 5—5 of Fig. 4.

Referring now to Figs. 1, 2, and 3, showing the wardrobe assembled for use in an automobile, the wardrobe consists of two complementary and inter-communicating compartments referred to herein for convenience as a floor-engaging section 1 and a rear-seat-engaging section 2 which, when assembled, as in Fig. 1, take up a little less than one-half of the left rear portion of the automobile. The body of the wardrobe is conveniently and preferably made up of light-weight sheet steel or sheet aluminum stamped or pressed into the configuration and contours shown in the drawings. It is to be understood, however, that the structure could be built up of light plywood or the like.

During the stamping or pressing operation, the rear-seat-engaging section, as clearly shown in Figs. 2 and 5, is provided with vertically disposed flanges or ribs 3 and 4 which are pressed in complementary to the edges of the rear and front surfaces, respectively, of the floor-engaging section so that the exposed surfaces of the two sections are flush one with the other when assembled as by one or more sets of latches 5 and 6. As shown, each section is cut out in the front to form openings whose perimeters are stamped or pressed in as at 7 and 8 to provide for the snug reception of doors 9 and 10 hinged as at 11 and 12. Doors 9 and 10 are fitted with corresponding locks 9' and 10' to provide for safe storage of the wardrobe contents when traveling.

The floor-engaging section is provided at the bottom thereof with two sets of collars 13 and 14 at the front and in the rear thereof for the reception of stems 15 and 16 and integral feet 17 and 18. The stems may have one flat side, as shown, to prevent turning while collars 13 and 14 are fitted with wing nuts 19 and 20 for vertical adjustment of the stems 15 and 16. The forwardly disposed feet 17 are cut away as at 21 to straddle the drive shaft guard 22.

The front and rear faces of the rear-seat-engaging section are arcuately curved at the bottom as at 23 to ride on the surface of the rear seat 24 of the automobile. Inasmuch as the space between the front and rear seats of modern automobiles is more or less standardized, and particularly since the front seats of automobiles are adjustable, it is readily seen that the wardrobe structure of the present invention may be fitted very snugly into the rear of any modern automobile, as shown in Fig. 1.

The tops of both sections of the wardrobe are channeled out as shown at points 25 and 26 to provide for the reception of a straddling cupola section 27. In this connection, it will be noted that this channeling structure provides for tight fitting and thus for dustproof construction. Lengthwise of this cupola is provided a bar 28 for the reception of coat hangers 29 and the like. Latch means 30 assures a tight fit, along with the channel construction of the cupola on the top of the two wardrobe sections, and further provides for secure locking of the cupola to the wardrobe sections. Furthermore, as will be readily ascertained, the cupola provides for more head room for the wardrobe structure generally and leaves the entire length of the structure for the reception of clothing and the like.

The wardrobe is very easily and rapidly set up and assembled in the rear of the automobile by placing either of the sections in the back of the car and then assembling the complementary section thereto and then locking the sections one to the other. The cupola is then mounted and locked upon the assembled sections. The legs may be adjusted to fit the particular automobile in which the wardrobe is assembled.

In Fig. 4 there is shown the two sections of the wardrobe assembled and set up in the corner of a room, and for this purpose the rear-seat-engaging section is provided with rear and front collars 31 and legs 32. These legs may be retained with the structure when it is assembled in the rear of an automobile, as shown in Fig. 1, by drawing up the legs into the rear-seat-engaging section.

I claim:

1. A dual-purpose wardrobe for use in an automobile as well as in the home comprising a floor-engaging section, a complementary and wholly inter-communicating rear-seat-engaging section, and means for securing the sections one to the other to form a unitary wardrobe structure which, when assembled, fits snugly into the rear of an automobile and to one side thereof.

2. A dual-purpose wardrobe for use in an automobile as well as in the home comprising a floor-engaging section, a complementary and wholly inter-communicating rear-seat-engaging section, means for securing the sections one to the other to form a unitary wardrobe structure which, when assembled, fits snugly into the rear of an automobile and to one side thereof, and a cupola straddling the tops of both sections and in communication therewith.

3. A dual-purpose wardrobe for use in an automobile as well as in the home comprising a floor-engaging section having vertically adjustable legs, a complementary and wholly inter-communicating rear-seat-engaging section, means for securing the sections one to the other to form a unitary wardrobe structure which, when assembled, fits snugly into the rear of an automobile and to one side thereof, and a cupola straddling the tops of both sections and in communication therewith.

4. A dual-purpose wardrobe for use in an automobile as well as in the home comprising a floor-engaging section having vertically adjustable legs, a complementary and wholly inter-communicating rear-seat-engaging section whose lower portion is provided with an arcuate contour to accommodate the surface of the rear seat of an automobile, means for securing the sections one to the other to form a unitary wardrobe structure which, when assembled, fits snugly into the rear of an automobile and to one side thereof, and a cupola straddling the tops of both sections and in communication therewith.

5. A dual-purpose wardrobe for use in an automobile as well as in the home comprising a floor-engaging section having vertically adjustable legs, a complementary and wholly inter-communicating rear-seat-engaging section whose lower portion is provided with an arcuate contour to accommodate the surface of the rear seat of an automobile and retractible legs for engagement with the floor when the wardrobe is used in the home, means for securing the sections one to the other to form a unitary wardrobe structure which, when assembled, fits snugly into the rear of an automobile and to one side thereof, and a cupola straddling the tops of both sections and in communication therewith.

6. A dual-purpose wardrobe for use in an automobile as well as in the home comprising a floor-engaging section having vertically adjustable legs, a complementary and wholly inter-communicating rear-seat-engaging section whose lower portion is provided with an arcuate contour to accommodate the surface of the rear seat of an automobile and retractible legs for engagement with the floor when the wardrobe is used in the home, means for securing the sections one to the other to form a unitary wardrobe structure which, when assembled, fits snugly into the rear of an automobile and to one side thereof, a cupola straddling the tops of both sections and in communication therewith, a horizontally disposed rod in the cupola for the reception of coat-hangers and the like, and a door in each of said wardrobe sections.

HARRY M. KLEE

REFERENCES CITED

The following references are of record in the file of this patent:

UNITED STATES PATENTS

| Number | Name | Date |
|---|---|---|
| 310,703 | Mehrer | Jan. 13, 1885 |
| 619,174 | Haskins | Feb. 7, 1899 |
| 1,184,455 | Hough | May 23, 1916 |
| 2,313,834 | Mathaus | Mar. 16, 1943 |